United States Patent
Hong (10) Patent No.: US 12,284,556 B2
(45) Date of Patent: Apr. 22, 2025

(54) METHOD AND DEVICE FOR CELL HANDOVER

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 503 days.

(21) Appl. No.: 17/617,871

(22) PCT Filed: Jun. 10, 2019

(86) PCT No.: PCT/CN2019/090598
§ 371 (c)(1),
(2) Date: Dec. 9, 2021

(87) PCT Pub. No.: WO2020/248107
PCT Pub. Date: Dec. 17, 2020

(65) Prior Publication Data
US 2022/0312292 A1  Sep. 29, 2022

(51) Int. Cl.
*H04W 36/00* (2009.01)
*H04W 36/30* (2009.01)

(52) U.S. Cl.
CPC ..... *H04W 36/0058* (2018.08); *H04W 36/302* (2023.05)

(58) Field of Classification Search
None
See application file for complete search history.

(56) References Cited

U.S. PATENT DOCUMENTS

| | | | |
|---|---|---|---|
| 11,240,740 B2* | 2/2022 | Li | H04W 48/16 |
| 2013/0337848 A1* | 12/2013 | Huertgen | H04W 36/324 |
| | | | 455/456.6 |
| 2014/0146732 A1* | 5/2014 | Olufunmilola | H04L 5/0073 |
| | | | 370/329 |
| 2017/0019819 A1* | 1/2017 | Yang | H04B 7/1855 |
| 2017/0048773 A1* | 2/2017 | Miao | H04W 8/183 |
| 2017/0367085 A1* | 12/2017 | Chakraborty | H04W 36/0072 |
| 2018/0041953 A1* | 2/2018 | Lindoff | H04W 24/08 |
| 2018/0234136 A1* | 8/2018 | Marinier | H04B 7/024 |
| 2018/0317139 A1* | 11/2018 | Li | H04W 48/10 |
| 2018/0352492 A1* | 12/2018 | Dang | H04W 36/0061 |
| 2019/0124708 A1* | 4/2019 | Shi | H04W 88/10 |
| 2019/0363843 A1* | 11/2019 | Gordaychik | H04L 1/08 |
| 2020/0008007 A1* | 1/2020 | Belghoul | H04W 4/50 |
| 2020/0053585 A1* | 2/2020 | Saxena | H04W 72/0453 |
| 2020/0154305 A1* | 5/2020 | Link, II | H04W 76/12 |

(Continued)

FOREIGN PATENT DOCUMENTS

| CN | 101198136 A | 6/2008 |
|---|---|---|
| CN | 102036350 A | 4/2011 |
| CN | 102440027 A | 5/2012 |

OTHER PUBLICATIONS

PCT/CN2019/090598 English translation of the International Search Report dated Feb. 28, 2020, 2 pages.

*Primary Examiner* — Phirin Sam
(74) *Attorney, Agent, or Firm* — Cozen O'Connor (57) ABSTRACT

A method for cell handover. The method comprising: when a terminal comprises N subscriber identification modules, the wireless signal quality is measured using one of the N subscriber identification modules, wherein N is greater than or equal to 2.

13 Claims, 6 Drawing Sheets

(56) References Cited

U.S. PATENT DOCUMENTS

| | | | |
|---|---|---|---|
| 2020/0187033 A1* | 6/2020 | Tang | H04W 36/00835 |
| 2021/0144573 A1* | 5/2021 | Yoon | H04B 17/318 |
| 2022/0132356 A1* | 4/2022 | Jung | H04W 36/0088 |
| 2023/0362710 A1* | 11/2023 | Link, II | H04L 47/2441 |
| 2024/0031852 A1* | 1/2024 | Jiang | H04W 24/04 |
| 2024/0049033 A1* | 2/2024 | Kim | H04L 5/005 |

\* cited by examiner

METHOD AND DEVICE FOR CELL HANDOVER

CROSS-REFERENCE TO RELATED APPLICATION

This application is the US national phase application of International Application No. PCT/CN2019/090598, filed on Jun. 10, 2019, the entire content of which is incorporated herein by reference for all purposes.

TECHNICAL FIELD

The disclosure relates to, but is not limited to, a field of wireless communication technologies, and in particularly, to a method and an apparatus for cell handover and a storage medium.

BACKGROUND

With the development of wireless communication technology, multi-SIM terminal equipment with two or even more SIM (Subscriber Identification Module) cards has gradually increased in popularity due to its convenience.

Currently, processing method with respect to the multi-SIM mobile phone is mainly based on the implementation of various terminal manufacturers, and there is no unified standard, resulting in a variety of different terminal behaviors and processing modes. During cell handover, the multi-SIM terminal will consume more power and shorten the standby time of the terminal.

SUMMARY

According to a first aspect of the present disclosure, a method for cell handover is provided. The method is applied to a terminal, and includes:

when the terminal comprises N subscriber identification modules, measuring a wireless signal quality with one of the N subscriber identification modules, wherein N is an integer greater than or equal to 2; and when a measurement result of the measured wireless signals meets a preset report sending condition, sending a measurement report corresponding to the measurement result to a source base station, wherein the measurement report comprises identification information of subscriber identification modules other than the subscriber identification module measuring the wireless signal quality in the N subscriber identification modules.

According to a second aspect of the present disclosure, a method for cell handover is provided. The method is applied to a base station, and includes:

when a terminal comprises N subscriber identification modules, sending measurement configuration information for one of the N subscriber identification modules to measure a wireless signal quality to the terminal, wherein N is an integer greater than or equal to 2;

receiving a measurement report corresponding to one of the N subscriber identification modules; and sending a cell handover request to a target base station according to the measurement report.

According to a third aspect of the present disclosure, a method for cell handover is provided. The method is applied to a base station, and includes:

receiving a cell handover request sent by a source base station, wherein the cell handover request includes identification information of N subscriber identification modules comprised in a terminal; and attaching the N subscriber identification modules to a target cell corresponding to the target base station according to the identification information of N subscriber identification modules, wherein N is greater than or equal to 2.

According to a fourth aspect of the present disclosure, a communication device is provided, including a processor, a transceiver, a memory and an executable program stored in the memory and capable of running on the processor, wherein the processor is configured to implement the method for cell handover according to the first aspect, the second aspect or the third aspect when running the executable program.

According to a fifth aspect of the present disclosure, a storage medium is provided, stored thereon with an executable program, wherein when the executable program is executed by the processor, the method for cell handover according to the first aspect, the second aspect or the third aspect is implemented.

It should be understood that the general description above and the detailed description below are only illustrative and explanatory and do not limit embodiments of the present disclosure.

BRIEF DESCRIPTION OF THE DRAWINGS

The appended drawings herein are incorporated into the specification and form a part of the specification, showing conformity with embodiments of the present disclosure and used together with the specification to explain principles of embodiments of the present disclosure.

DETAILED DESCRIPTION

Exemplary embodiments will be explained in detail here, and examples are shown in the attached drawings. Where the following description relates to appended drawings, the same numbers in different appended drawings indicate the same or similar elements, unless otherwise indicated. Implementations described in the following exemplary embodiments do not represent all implementations consistent with embodiments of the present disclosure. Rather, they are only examples of devices and methods which are consistent with some aspects of embodiments of the disclosure as detailed in the attached claims.

The terms used in embodiments of the disclosure are intended solely to describe a particular embodiment and are not intended to restrict embodiments of the disclosure. The singular forms "a", "said" and "the" used in embodiments of the disclosure and the accompanying claims are also intended to include majority forms, unless the context clearly indicates otherwise. It should also be understood that the terms "and/or" used herein refer to include any or all possible combinations of one or more associated listed items.

It should be understood that, although the terms first, second, third, etc., may be used in embodiments of this disclosure to describe various information, such information should not be limited to those terms. These terms are used only to distinguish information of the same type from one another. For example, without departing from the scope of embodiments of this disclosure, first information may also be referred to as second information, and similarly, second information may also be referred to as first information. Depending on the context, the word "if" used here can be interpreted as "when . . . " or "at the time of . . . " or "in response to determining . . . ".

Figure 1:
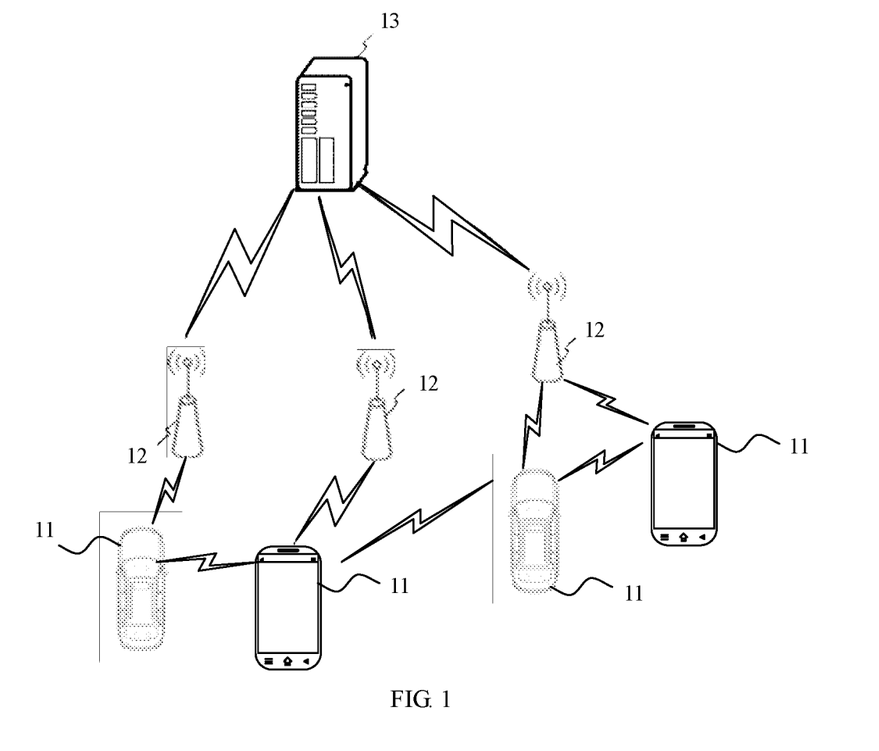
FIG. 1 is a schematic diagram illustrating a wireless communication system according to an exemplary embodiment of the disclosure.

FIG. 1 is a schematic diagram illustrating a wireless communication system according to embodiments of the disclosure. As illustrated in FIG. 1, the wireless communication system is a communication system based on cellular mobile communication technology, and the wireless communication system may include several base stations 11 and several terminals 12.

The terminal 11 may be a device that provides voice and/or data connectivity to users. The terminal 11 can communicate with one or more core networks over a Radio Access Network (RAN), and the terminal 11 may be IOT terminals such as sensor devices, mobile phones (or "cellular" phones), and computers with IOT terminals, for example, which may be stationary, portable, pocket, handheld, computer-built or vehicle-mounted devices. For example, the terminal may be a station (STA), subscriber Unit, subscriber station, mobile station, mobile, remote station, access point, remote terminal, access terminal, user terminal, user agent, user device, or user equipment (UE). Alternatively, the terminal 11 may also be an unmanned vehicle. Alternatively, the terminal 11 may be an on-board device, for example, a driving computer with wireless communication capabilities, or a wireless communication device connected to an external driving computer. Alternatively, the terminal 11 may be a roadside device, such as a street lamp, signal light, or other roadside device with wireless communication capabilities.

The base station 12 may be a network side device in a wireless communication system. The wireless communication system may be the 4th generation mobile communication (4G) system, also known as Long Term Evolution (LTE) system. Alternatively, the wireless communication system may be a 5G system, also known as a New Radio (NR) system or a 5G NR system. Alternatively, the wireless communication system may be the next generation of 5G systems. The Access Network in 5G system may be called NG-RAN (New Generation-Radio Access Network). Alternatively, the wireless communication system may be an MTC system.

The base station 12 may be an evolved base station (eNB) used in 4G systems. Alternatively, the base station 12 may be a base station with a centralized distributed architecture (gNB) in 5G systems. When the base station 12 adopts the centralized distributed architecture, it usually includes a central unit (CU) and at least two distributed units (DUs). The centralized unit is provided with protocol stacks of a Packet Data Convergence Protocol (PDCP) layer, a Radio Link Control (RLC) layer, and a Media Access Control (MAC) layer. The distributed unit is provided with a Physical (PHY) layer protocol stack. The specific implementation of the base station 12 is not limited in embodiments of the disclosure.

A wireless connection may be established between the base station 12 and the terminal 11 through a wireless air interface. In different implementations, the wireless air interface is a wireless air interface based on the fourth generation mobile communication network technology (4G) standard. Alternatively, the wireless air interface is a wireless air interface based on the fifth generation mobile communication network technology (5G) standard, such as the wireless air interface is a new air interface. Alternatively, the wireless air interface may be a wireless air interface based on the next generation of mobile network technology standard of 5G In some embodiments, an E2E (End to End) connection can also be established between terminals 11, for example, in scenarios of vehicle-to-vehicle (V2V) communication, vehicle-to-infrastructure (V2I) communication, and vehicle-to-pedestrian (V2P) communication in Vehicle to Everything (V2X) communication.

In some embodiments, the wireless communication system may also include a network management device 13.

Several base stations 12 are connected with the network management device 13 respectively. The network management device 13 may be a core network device in the wireless communication system. For example, the network management device 13 may be a mobility management entity (MME) in Evolved Packet Core (EPC) networks. Alternatively, the network management device may also be other core network device, such as serving gateway (SGW), public data network gateway (PGW), policy and charging rules function (PCRF) or home subscriber server (HSS). The implementation form of network management device 13 is not limited in embodiments of the present disclosure.

The executive bodies involved in embodiments of the disclosure include but are not limited to: terminals, base stations and the like that support multiple subscriber identification modules.

The application scenario of embodiments of the disclosure is that for a multi-subscriber identification module terminal, namely a multi-SIM terminal, different subscriber identification modules are considered as different terminals in the current network, and the multi-subscriber identification module terminal separately perform cell handover for multiple subscriber identification modules. When the terminal carries out cell handover, the multiple subscriber identification modules measure multiple signal strengths of the neighbor cell and reports them according to the rule set by the base station, which consumes power of the terminal.

Figure 2:
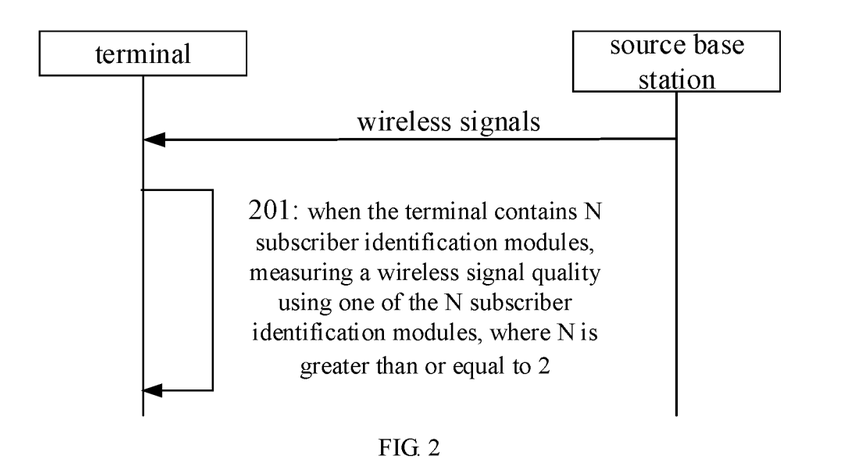
FIG. 2 is a flow chart illustrating a method for cell handover according to an exemplary embodiment of the disclosure.

FIG. 2 is a flow chart of a method for cell handover according to an exemplary embodiment. As illustrated in FIG. 2, the method can be applied to a wireless communication device such as a terminal, and includes followings.

At step 201, when the terminal comprises N subscriber identification modules, a wireless signal quality is measured using one of the N subscriber identification modules, wherein N is greater than or equal to 2.

Here, the N subscriber identification modules may include two or more than two subscriber identification modules. The terminal is a terminal including multiple subscriber identification modules. A behavior mode of the multi-subscriber identification module terminal may be double-card double-standby single-pass, double-card double-standby double-pass, three-card triple-standby, etc.

The subscriber identification module may be a subscriber identification module (SIM) card existing in a separate individual form or an embedded subscriber identification module (E-SIM) existing in the terminal in an integrated form.

The measurement of wireless signal quality may be the measurement of cell signal quality. The cell signal quality may include: the signal quality of the cell and the signal quality of the neighboring cell. Here, the measurement content may include cell numbers, and the signal quality of reference signal of the cell, for example, RSRP (Reference Signal Receiving Power) values and RSRQ (Reference Signal Receiving Quality) values of neighboring cell base stations, RSRP and RSRQ values of the source base station, etc. The measurement result can be used as the basis of cell handover.

One of the N subscriber identification modules may be pre-selected. The selected subscriber identification module is used to measure the wireless signal quality. Other subscriber identification modules no longer measure the wireless signal quality, but take the wireless signal quality measurement result of the selected subscriber identification module as the reference for cell handover.

One of the N subscriber identification modules is used to measure the wireless signal quality. The subscriber identification module consumes electricity for measurement. Other subscriber identification modules no longer measure the wireless signal quality. In this way, it can use less power and save more energy.

In some embodiments, the method further includes receiving measurement configuration information for one or more of the N subscriber identification modules.

Step 201 may include measuring the wireless signal quality using one of the N subscriber identification modules according to the measurement configuration information.

Here, the source base station can send the measurement configuration information to the terminal, and the terminal can learn the measurement items to be included in the measurement report and the determination method of sending time from the measurement configuration information. Measurement items can include: RSRP and RSRQ, etc. The sending time can be determined in the following ways: sending in response to a trigger or periodic sending. The terminal can measure the corresponding measurement item by one of the N subscriber identification modules according to the measurement configuration information. The source base station refers to the base station to which the service cell where the terminal is currently in belong.

In some embodiments, receiving measurement configuration information of one or more subscriber identification modules in the N subscriber identification modules includes: receiving measurement configuration information of each subscriber identification module in the N subscriber identification modules; and selecting one from the N subscriber identification modules for measuring the wireless signal quality.

Step 201 may include measuring the wireless signal quality using the selected one subscriber identification module according to the measurement configuration information of the selected one subscriber identification module.

The base station cannot identify whether N subscriber identification modules belong to the same terminal, so that each subscriber identification module in the N subscriber identification modules is identified as a separate terminal. When sending measurement configuration information, the measurement configuration information is sent to each subscriber identification module in the N-subscriber identification module terminal. Here, the N-subscriber identification module terminal can select one of N subscriber identification modules to measure the wireless signal quality after receiving the measurement configuration information sent to each subscriber identification module. Other subscriber identification modules take the measurement result of this subscriber identification module as reference. The mode of selecting the subscriber identification module can be preset, for example, the subscriber identification module that occupies a high proportion of talk time or the subscriber identification module that uses the data network frequently can be selected. In this way, the number of subscriber identification modules for wireless signal quality measurement is reduced, and then the power consumption of other subscriber identification modules for wireless signal quality measurement is saved.

In some embodiments, receiving measurement configuration information of one or more subscriber identification modules in the N subscriber identification modules includes: receiving measurement configuration information of one subscriber identification module in the N subscriber identification modules.

Step 201 may include measuring the wireless signal quality using one subscriber identification module corresponding to the received measurement configuration information according to the received measurement configuration information.

Here, N subscriber identification modules belonging to the same terminal can be informed to the base station by means of terminal information reporting. After identifying the N subscriber identification modules belonging to the same terminal, the base station sends the measurement configuration information to one subscriber identification module. After receiving the measurement configuration information, the subscriber identification module can measure the wireless signal quality.

At the base station side, the channel, power supply and other resources can be saved, since the measurement configuration information of only one subscriber identification module is sent. At the terminal side, the selected subscriber identification module is used to measure the wireless signal quality, saving the power consumption of other subscriber identification modules for measuring the wireless signal quality.

In some embodiments, the method further includes: when the measurement result of the measured wireless signals meets a preset report sending condition, sending the measurement report corresponding to the measurement result to the source base station, wherein the measurement report includes identification information of subscriber identification modules other than the subscriber identification module measuring the wireless signal quality in the N subscriber identification modules.

Here, the measurement report may be sent in response to a trigger or periodically. Sending in response to a trigger may include, sending the measurement report in response to a trigger that the measurement result meets the preset cell handover condition. The preset report sending condition can be set based on sending in response to a trigger and/or periodical sending. The terminal puts the identification information of the subscriber identification modules that do not carry out wireless signal quality measurement in the N subscriber identification modules into the measurement report, that is, put the identification information of N−1 subscriber identification modules into the measurement report, so that in cell handover, the N subscriber identification modules can be switched together.

The measurement report comprises content of the measurement result, and the source base station determines whether to carry out cell handover. The source base station determines the subscriber identification modules for cell handover according to the identification information of subscriber identification modules other than the subscriber identification module for quality measurement comprised in the measurement report, as well as the subscriber identification module that sends the measurement report. For example, the terminal has three SIM cards, one of which carries out wireless signal measurement and sends the measurement report to the source base station. The measurement report includes the identification information of the other two SIM cards that do not carry out wireless signal measurement. The source base station can determine the identification information of the SIM card that sends the measurement report. In this way, the source base station obtains the identity information of all the SIM cards that need to carry out cell handover. In cell handover, all subscriber identification modules corresponding to the identification information in the measurement report and the subscriber identification module that sends the measurement report will carry out cell handover operation together.

In this way, the transmission of measurement report for each subscriber identification module may be reduced, improving the transmission efficiency of measurement report, and reducing the power consumption and other resources consumption of the terminal and the base station.

In some embodiments, networks to which the N subscriber identification modules are connected belong to a same operator.

The networks to which the N subscriber identification modules are connected belong to the same operator. One of the subscriber identification modules is used to carry out wireless signal quality test, and the measurement result has more reference significance for other subscriber identification modules. Here, the same operator means that the network services, base stations and other equipment of the networks to which two subscriber identification modules are connected are provided by the same operator.

The networks to which the N subscriber identification modules in the terminal are connected belong to the same operator, then the network environments where the networks to which respective subscriber identification modules are connected are located are more consistent, and the timing of cell handover is closer. When one of the subscriber identification modules meets the cell handover condition, the other subscriber identification modules also meet the cell handover condition or are close to meeting the cell handover condition. In this way, cell handover of the N subscriber identification modules in the terminal can be performed more accurately, reducing unnecessary cell handover.

Moreover, the subscriber identification modules belonging to different operator networks are usually connected to different base stations. Thus, in practical application, the operability is much better for the subscriber identification modules of the same operator.

Figure 3:
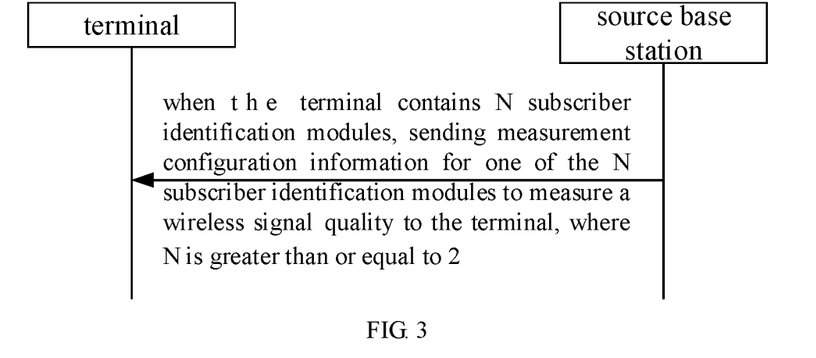
FIG. 3 is a flow chart illustrating a method for cell handover according to another exemplary embodiment of the disclosure.

FIG. 3 is a flow chart of a method for cell handover according to an exemplary embodiment. As illustrated in FIG. 3, the method may be applied to a source base station in the process of cell handover, and includes:

when a terminal comprises N subscriber identification modules, sending measurement configuration information for one of the N subscriber identification modules to measure a wireless signal quality to the terminal, wherein N is greater than or equal to 2.

Here, the N subscriber identification modules may include two or more than two subscriber identification modules. When the terminal comprises N subscriber identification modules, any one of the N subscriber identification modules can be used to measure the wireless signal quality. In this way, the power consumed by the terminal for wireless signal quality measurement can be reduced.

Here, the terminal is a terminal including multiple subscriber identification modules, and a behavior mode of the multi-subscriber identification module terminal may be double-card double-standby single-pass, double-card double-standby double-pass, three-card triple-standby, etc.

The subscriber identification module may be a SIM card existing in a separate individual form or an E-SIM existing in the terminal in an integrated form.

The measurement of wireless signal quality may be the measurement of cell signal quality. The cell signal quality may include: the signal quality of the cell and the signal quality of the neighboring cell. Here, the measurement content may include: cell numbers, and the signal quality of reference signal of the cell, for example, RSRP values and RSRQ values of the cell base stations, RSRP and RSRQ values of the source base station, etc; neighboring cell numbers, RSRP values and RSRQ values of the neighboring cell base stations, RSRP and RSRQ values of the source base station, etc. The measurement result can be used as the basis of cell handover.

One of the N subscriber identification modules may be pre-selected. The selected subscriber identification module is used to measure the wireless signal quality. Other subscriber identification modules no longer measure the wireless signal quality, but take the wireless signal quality measurement result of the selected subscriber identification module as the reference.

Here, the source base station can send the measurement configuration information to the terminal, and the terminal can learn the measurement items to be included in the measurement report and the determination method of sending time from the measurement configuration information. Measurement items can include: RSRP and RSRQ, etc. The sending time can be determined in the following ways: sending through trigger or periodic sending. The terminal can measure the corresponding measurement item by one of the N subscriber identification modules according to the measurement configuration information. The source base station refers to the base station to which the service cell where the terminal is currently in belong.

In some embodiments, sending measurement configuration information for one of the N subscriber identification modules to measure the wireless signal quality to the terminal includes:

sending measurement configuration information for each of the N subscriber identification modules to measure the wireless signal quality to the terminal.

The base station cannot identify whether N subscriber identification modules belong to the same terminal, so that each subscriber identification module in the N subscriber identification modules is identified as a separate terminal. When sending measurement configuration information, the measurement configuration information is sent to each subscriber identification module in the N-subscriber identification module terminal. Here, the N-subscriber identification module terminal can select one of N subscriber identification modules to measure the wireless signal quality after receiving the measurement configuration information sent to each subscriber identification module. Other subscriber identification modules take the measurement result of this subscriber identification module as reference. The mode of selecting the subscriber identification module can be preset, for example, the subscriber identification module that occupies a high proportion of talk time or the subscriber identification module that uses the data network frequently can be selected. In this way, the number of subscriber identification modules for wireless signal quality measurement is reduced, and then the power consumption of other subscriber identification modules for wireless signal quality measurement is saved.

In some embodiments, sending measurement configuration information for one of the N subscriber identification modules to measure the wireless signal quality to the terminal includes:

sending measurement configuration information for one of the N subscriber identification modules to measure the wireless signal quality to the terminal.

Here, N subscriber identification modules belonging to the same terminal can be informed to the base station by means of terminal information reporting. After identifying the N subscriber identification modules belonging to the same terminal, the base station sends the measurement configuration information to one subscriber identification module. After receiving the measurement configuration information, the subscriber identification module can measure the wireless signal quality.

At the base station side, the channel, power supply and other resources can be saved, since the measurement configuration information of only one subscriber identification module is sent. At the terminal side, the selected subscriber identification module is used to measure the wireless signal quality, saving the power consumption of other subscriber identification modules for measuring the wireless signal quality.

In some embodiments, networks to which the N subscriber identification modules are connected belong to a same operator. Here, the same operator means that the network services, base stations and other equipment of the networks to which two subscriber identification modules are connected are provided by the same operator.

The networks to which the N subscriber identification modules are connected belong to the same operator. One of the subscriber identification modules is used to carry out wireless signal quality test, and the measurement result has more reference significance for other subscriber identification modules.

The networks to which the N subscriber identification modules in the terminal are connected belong to the same operator, then the network environments where the networks to which respective subscriber identification modules are connected are located are more consistent, and the timing of cell handover is closer. When one of the subscriber identification modules meets the cell handover condition, the other subscriber identification modules also meet the cell handover condition or are close to meeting the cell handover condition. In this way, cell handover of the N subscriber identification modules in the terminal can be performed more accurately, reducing unnecessary cell handover.

Moreover, the subscriber identification modules belonging to different operator networks are usually connected to different base stations. Thus, in practical application, the operability is much better for the subscriber identification modules of the same operator.

In some embodiments, the measurement report includes identification information of subscriber identification modules other than the subscriber identification module measuring the wireless signal quality in the N subscriber identification modules.

Here, the measurement report comprises content of the measurement result, and the source base station determines whether to carry out cell handover. The source base station determines the subscriber identification modules for cell handover according to the identification information of subscriber identification modules other than the subscriber identification module for quality measurement comprised in the measurement report, as well as the subscriber identification module that sends the measurement report. For example, the terminal has three SIM cards, one of which carries out wireless signal measurement and sends the measurement report to the source base station. The measurement report includes the identification information of the other two SIM cards that do not carry out wireless signal measurement. The source base station can determine the identification information of the SIM card that sends the measurement report. In this way, the source base station obtains the identity information of all the SIM cards that need to carry out cell handover. In cell handover, all subscriber identification modules corresponding to the identification information in the measurement report and the subscriber identification module that sends the measurement report will carry out cell handover operation together.

The measurement report comprises content of the measurement result, and the source base station determines whether to carry out cell handover. According to the measurement report, the source base station has the identification information of the N subscriber identification modules. During cell handover, all subscriber identification modules corresponding to the identification information will carry out cell handover operation together.

In some embodiments, the cell handover request includes the identification information of the N subscriber identification modules.

When the source base station sends the handover request to the target base station, the identification information of the N subscriber identification modules can be informed to the target base station at the same time, so that the target base station together accepts the connection of the N subscriber identification modules of the terminal.

Thus, in the whole process of cell handover, the terminal only performs the wireless signal quality measurement of one subscriber identification module, which compared with N subscriber identification modules for wireless signal quality measurement, reduces the power consumption. Moreover, the source base station and the target base station also do not need to perform measurement configuration and process sending and receiving the cell handover request for each subscriber identification module, which improves the efficiency.

Figure 4:
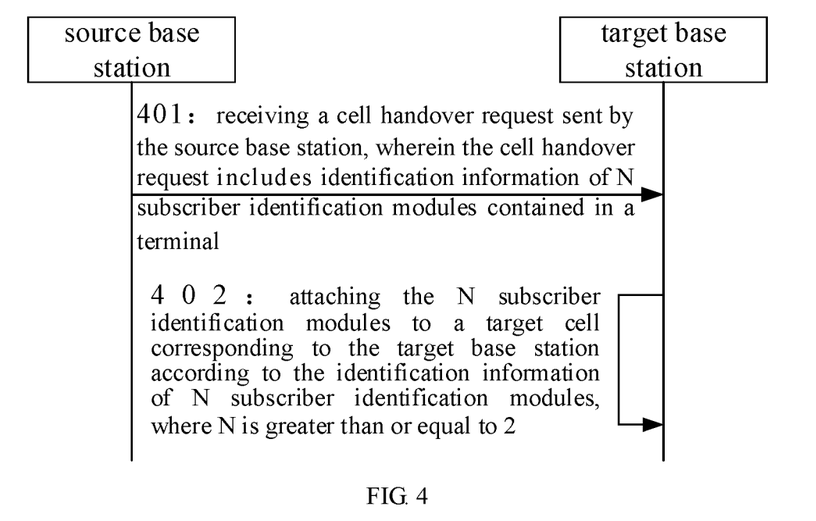
FIG. 4 is a flow chart illustrating a method for cell handover according to yet another exemplary embodiment of the disclosure.

FIG. 4 is a flow chart of a method for cell handover according to an exemplary embodiment. As illustrated in FIG. 4, the method can be applied to a target base station in a process of cell handover, and includes followings.

At step 401, a cell handover request sent by a source base station is received, wherein the cell handover request includes identification information of N subscriber identification modules comprised in a terminal.

At step 402, the N subscriber identification modules are attached to a target cell corresponding to the target base station according to the identification information of N subscriber identification modules, wherein N is greater than or equal to 2.

Here, the N subscriber identification modules may include two or more than two subscriber identification modules. The terminal is a terminal including multiple subscriber identification modules, and a behavior mode of the multi-subscriber identification module terminal may be double-card double-standby single-pass, double-card double-standby double-pass, three-card triple-standby, etc.

The subscriber identification module may be a SIM card existing in a separate individual form or an E-SIM existing in the terminal in an integrated form.

The terminal can send the identification information of the N subscriber identification modules to the source base station through a measurement report. When the source base station sends the handover request to the target base station, the identification information of the N subscriber identification modules can be informed to the target base station at the same time, so that the target base station together accepts the connection of the N subscriber identification modules of the terminal.

Thus, in the whole process of cell handover, the terminal only performs the wireless signal quality measurement of one subscriber identification module, which compared with N subscriber identification modules for wireless signal quality measurement, reduces the power consumption. Moreover, the source base station and the target base station also do not need to perform measurement configuration and process sending and receiving the cell handover request for each subscriber identification module, which improves the efficiency.

The following provides a concrete example combined with any of the above embodiments.

This example applies to a scenario where multiple SIM cards of a multi-SIM User Equipment (UE) belong to the same operator and two SIM cards of the multi-SIM UE are in the connected state.

If the base station does not know that the UE is the multi-SIM UE, the base station can configure the measurement configuration of multiple SIM cards of the multi-SIM UE independently. However, the multi-SIM UE only selects one SIM card for measurement at the same time and performs subsequent measurement reporting. When the measurement event meeting the handover condition occurs, the SIM card will inform the base station of the information of other SIM cards on the UE where the SIM card is located when sending the measurement report to the base station. In this way, when the base station sends the handover request to the target base station, the information of other SIM cards can be informed to the target base station at the same time, so that the target base station can accept the connection of multiple SIM cards of the multi-SIM UE together.

If the base station knows that the UE is a multi-SIM UE, the base station can configure the measurement configuration for a certain SIM card of the multi-SIM UE, but not for other SIM cards. Therefore, at the same time, the multi-SIM UE will only use the SIM card receiving the measurement configuration for measurement and perform subsequent measurement reporting. When the base station sends the handover request to the target base station, it can inform the target base station of the information of other SIM cards at the same time, so that the target base station can accept the connection of multiple SIM cards of the multi-SIM UE together.

Figure 5:
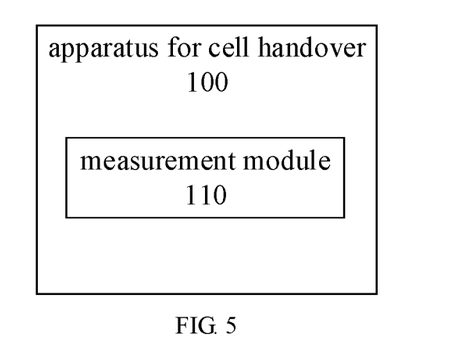
FIG. 5 is a block diagram illustrating an apparatus for cell handover according to an exemplary embodiment of the disclosure.

Embodiments of the present disclosure further provide an apparatus for cell handover applied to a terminal. FIG. 5 is a block diagram of an apparatus 100 for cell handover provided by embodiments of the present disclosure. As illustrated in FIG. 5, the apparatus 100 includes a measurement module 110.

The measurement module 110 is configured to, when the terminal comprises N subscriber identification modules, measure a wireless signal quality using one of the N subscriber identification modules, wherein N is greater than or equal to 2.

Figure 6:
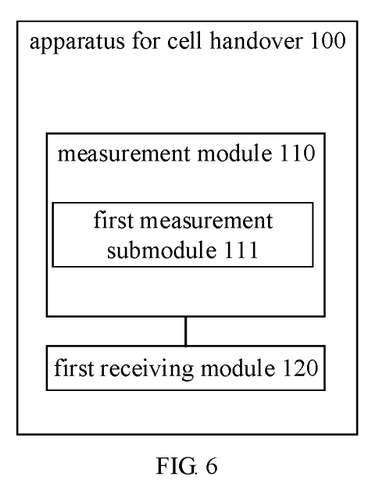
FIG. 6 is a block diagram illustrating an apparatus for cell handover according to another exemplary embodiment of the disclosure.

In some embodiments, as illustrated in FIG. 6, the apparatus further includes a first receiving module 120.

The first receiving module 120 is configured to receive measurement configuration information of one or more subscriber identification modules in the N subscriber identification modules.

The measurement module 110 includes a first measurement submodule 111.

The first measurement submodule is configured to measure the wireless signal quality using one of the N subscriber identification modules according to the measurement configuration information.

Figure 7:
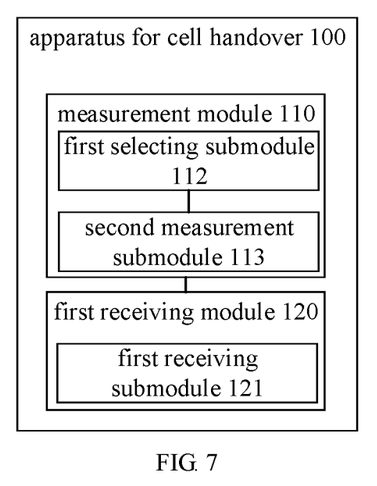
FIG. 7 is a block diagram illustrating an apparatus for cell handover according to yet another exemplary embodiment of the disclosure.

In some embodiments, as illustrated in FIG. 7, the first receiving module 120 includes a first receiving submodule 121.

The first receiving submodule 121 is configured to receive measurement configuration information of each subscriber identification module in the N subscriber identification modules.

The measurement module 110 includes a first selecting submodule 112 and a second measurement submodule 113.

The first selecting submodule 112 is configured to select one from the N subscriber identification modules for measuring the wireless signal quality.

The second measurement submodule 113 is configured to measure the wireless signal quality using one of the N subscriber identification modules according to the measurement configuration information of the selected one subscriber identification module.

Figure 8:
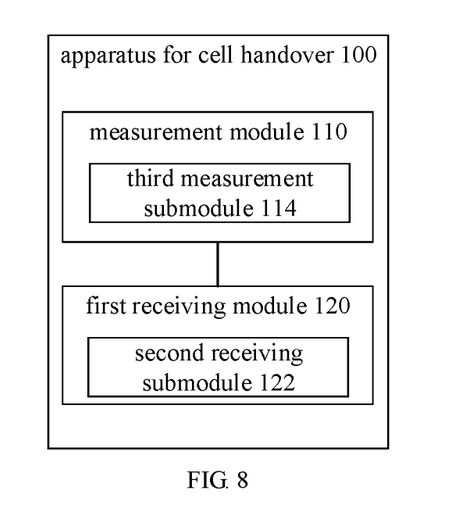
FIG. 8 is a block diagram illustrating an apparatus for cell handover according to still another exemplary embodiment of the disclosure.

In some embodiments, as illustrated in FIG. 8, the first receiving module 120 includes a second receiving submodule 122.

The second receiving submodule 122 is configured to receive measurement configuration information of one subscriber identification module in the N subscriber identification modules.

The measurement module 110 includes a third measurement submodule 114.

The third measurement submodule 114 is configured to measure the wireless signal quality using one subscriber identification module corresponding to the received measurement configuration information according to the received measurement configuration information.

Figure 9:
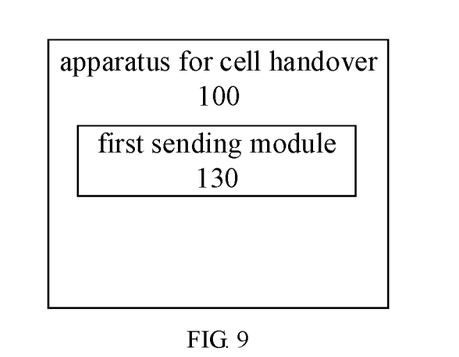
FIG. 9 is a block diagram illustrating an apparatus for cell handover according to still yet another exemplary embodiment of the disclosure.

In some embodiments, as illustrated in FIG. 9, the apparatus further includes a first sending module 130.

The first sending module 130 is configured to, when a measurement result of the measured wireless signals meets a preset report sending condition, send a measurement report corresponding to the measurement result to a source base station, wherein the measurement report includes identification information of subscriber identification modules other than the subscriber identification module measuring the wireless signal quality in the N subscriber identification modules.

In some embodiments, networks to which the N subscriber identification modules are connected belong to a same operator.

Figure 10:
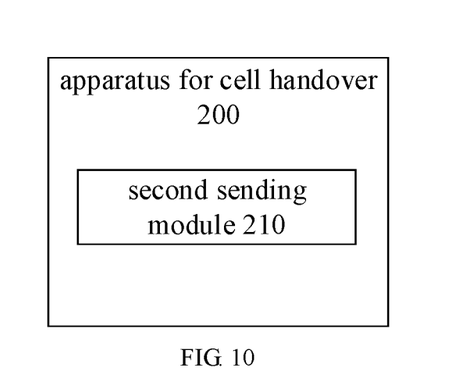
FIG. 10 is a block diagram illustrating an apparatus for cell handover according to an exemplary embodiment of the disclosure.

Embodiments of the present disclosure further provide an apparatus for cell handover applied to a source base station. FIG. 10 is a block diagram of an apparatus 120 for cell handover provided by embodiments of the present disclosure. As illustrated in FIG. 10, the apparatus 200 includes a second sending module 210.

The second sending module 210 is configured to, when a terminal comprises N subscriber identification modules, send measurement configuration information for one of the N subscriber identification modules to measure a wireless signal quality to the terminal, wherein N is greater than or equal to 2.

Figure 11:
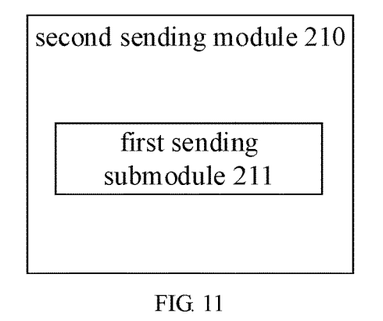
FIG. 11 is a block diagram illustrating an apparatus for cell handover according to another exemplary embodiment of the disclosure.

In some embodiments, as illustrated in FIG. 11, the second sending module includes a first sending submodule 211.

The first sending submodule 211 is configured to send measurement configuration information for each of the N subscriber identification modules to measure the wireless signal quality to the terminal.

Figure 12:
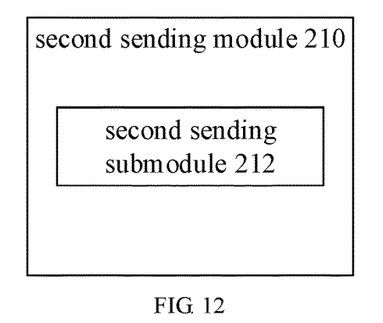
FIG. 12 is a block diagram illustrating an apparatus for cell handover according to yet another exemplary embodiment of the disclosure.

In some embodiments, as illustrated in FIG. 12, the second sending module 210 includes a second sending submodule 212.

The second sending submodule 212 is configured to send measurement configuration information for one of the N subscriber identification modules to measure the wireless signal quality to the terminal.

In some embodiments, networks to which the N subscriber identification modules are connected belong to a same operator.

Figure 13:
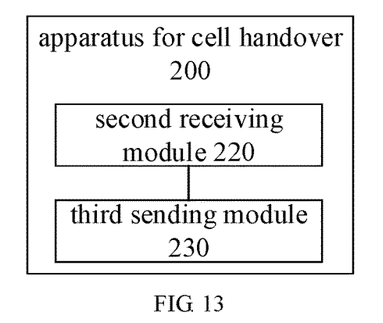
FIG. 13 is a block diagram illustrating an apparatus for cell handover according to still another exemplary embodiment of the disclosure.

In some embodiments, as illustrated in FIG. 13, the apparatus 200 further includes a second receiving module 220 and a third sending module 230.

The second receiving module 220 is configured to receive a measurement report corresponding to one of the N subscriber identification modules; and The third sending module 230 is configured to send a cell handover request to a target base station according to the measurement report.

In some embodiments, the measurement report includes: identification information of subscriber identification modules other than the subscriber identification module measuring the wireless signal quality in the N subscriber identification modules.

In some embodiments, the cell handover request includes identification information of the N subscriber identification modules.

Figure 14:
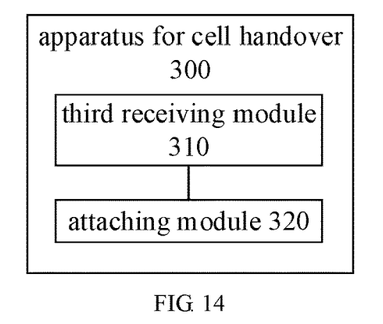
FIG. 14 is a block diagram illustrating an apparatus for cell handover according to an exemplary embodiment of the disclosure.

Embodiments of the present disclosure further provide an apparatus for cell handover applied to a target base station. FIG. 14 is a block diagram of an apparatus 300 for cell handover provided by embodiments of the present disclosure. As illustrated in FIG. 14, the apparatus 300 includes a third receiving module 310 and an attaching module 320.

The third receiving module 310 is configured to receive a cell handover request sent by a source base station, wherein the cell handover request includes identification information of N subscriber identification modules comprised in a terminal.

The attaching module 320 is configured to attach the N subscriber identification modules to a target cell corresponding to the target base station according to the identification information of N subscriber identification modules, wherein N is greater than or equal to 2.

In exemplary embodiments, the measurement module 110, the first receiving module 120, the first sending module 130, the second sending module 210, the second receiving module 220, the third sending module 230, the third receiving module 310, and the attaching module 320 can be implemented by one or more central processing units (CPUs), graphics processing units (GPU), baseband processor (BP), application specific integrated circuit (ASIC), DSP, Programmable Logic Device (PLD), complex Programmable Logic Device (CPLD), Field-programmable Gate Array (FPGA), Universal processor, controller, microcontroller unit (MCU), microprocessor, and other electronic components, or may also be combined with one or more radio frequency (RF) antennas, to perform the above methods.

Figure 15:
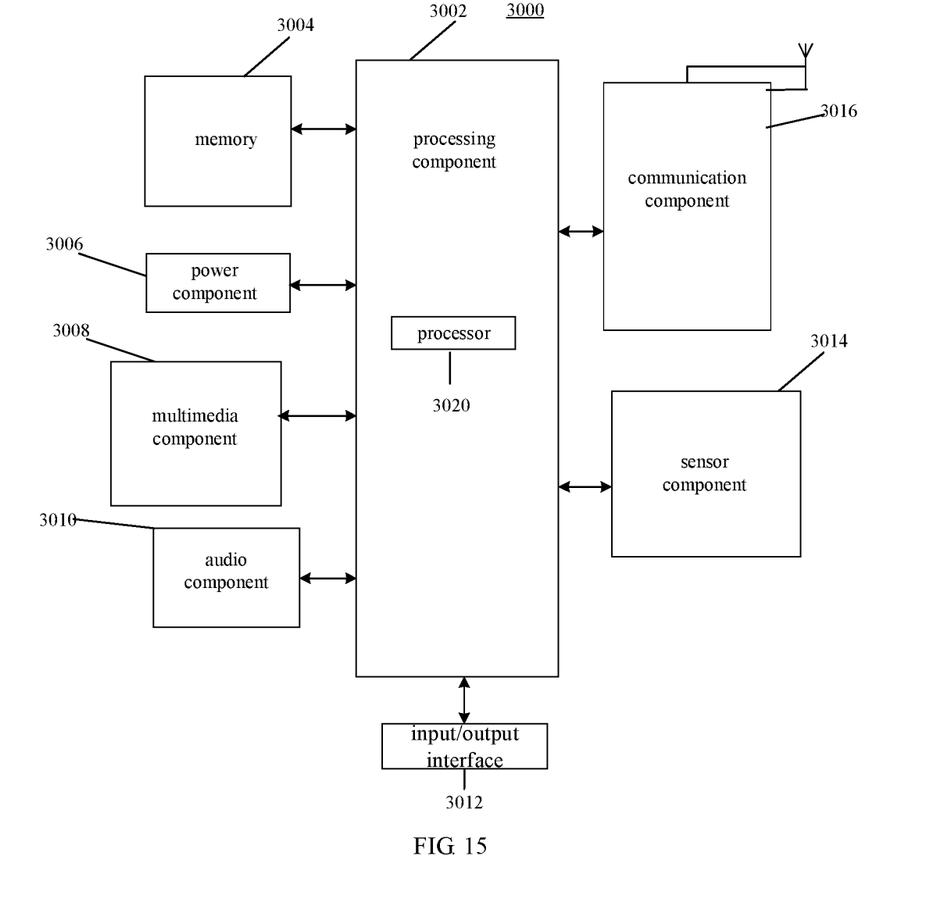
FIG. 15 is a block diagram illustrating an apparatus for cell handover according to another exemplary embodiment of the disclosure.

FIG. 15 is a block diagram of an apparatus 3000 for cell handover based on an exemplary embodiment. For example, the apparatus 3000 may be a mobile phone, computer, digital broadcast terminal, messaging device, game console, tablet device, medical device, fitness device, personal digital assistant, etc.

Referring to FIG. 21, the apparatus 3000 may include one or more of the following components: processing component 3002, memory 3004, power component 3006, multimedia component 3008, audio component 3010, input/output (I/O) interface 3012, sensor component 3014, and communication component 3016.

The processing component 3002 generally controls the whole operation of the apparatus 3000, such as the operations related to display, phone call, data communication, camera operation and recording operation. The processing component 3002 may include one or more processors 3020 to perform instructions, to complete all or part of steps of the above method. In addition, the processing component 3002 may include one or more modules for the convenience of interaction between the processing component 3002 and other components. For example, the processing component 3002 may include a multimedia module for the convenience of interaction between the multimedia component 3008 and the processing component 3002.

The memory 3004 is configured to store all types of data to support the operation of the apparatus 3000. Examples of the data include the instructions of any applications or methods operated on the apparatus 3000, contact data, phone book data, messages, pictures, videos, etc. The memory 3004 may be implemented by any type of volatile or non-volatile storage devices or their combination, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), Magnetic Memory, Flash Memory, Magnetic Disk or Optical Disk.

The power component 3006 may provide power supply for all components of the apparatus 3000. The power component 3006 may include power supply management system, one or more power supplies, and other units related to generating, managing and distributing power for the apparatus 3000.

The multimedia component 3008 includes an output interface screen provided between the apparatus 3000 and the user. In some examples, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some examples, the multimedia component 3008 includes a front camera and/or a rear camera. When the apparatus 3000 is in operation mode, such as shooting mode or video mode, the front camera or the rear camera may receive the external multimedia data. Each front camera and rear camera may be a fixed optical lens system or an optical lens system with focal length and optical zoom capacity.

The audio component 3010 is configured to output and/or input audio signals. For example, the audio component 3010 includes a microphone (MIC). When the apparatus 3000 is in operation mode, such as call mode, record mode, and speech recognition mode, the microphone is configured to receive the external audio signals. The audio signals received may be further stored in the memory 3004 or transmitted via the communication component 3016. In some examples, the audio component 3010 further includes a speaker configured to output an audio signal.

The I/O interface 3012 provides an interface for the processing component 3002 and the peripheral interface module, and the peripheral interface module may be a keyboard, a click wheel, a button, etc. The buttons may include but not limited to a home button, a volume button, a start button and a lock button.

The sensor component 3014 includes one or more sensors, configured to provide various aspects of status assessment for the apparatus 3000. For example, the sensor component 3014 may detect the on/off state of the apparatus 3000 and the relative positioning of the component. For example, the component is a display and a keypad of the apparatus 3000. The sensor component 3014 may further detect the location change of the apparatus 3000 or one component of the apparatus 3000, the presence or absence of contact between the user and the apparatus 3000, the orientation or acceleration/deceleration of the apparatus 3000, and the temperature change of the apparatus 3000. The sensor component 3014 may include a proximity sensor, which is configured to detect the existence of the objects nearby without any physical contact. The sensor component 3014 may further include a light sensor such as CMOS or CCD image sensor, which is configured to use in imaging applications. In some examples, the sensor component 3014 may further include an acceleration transducer, a gyroscope sensor, a magnetic sensor, a pressure sensor or a temperature sensor.

The communication module 3016 is configured for the convenience of wire or wireless communication between the apparatus 3000 and other devices. The apparatus 3000 may access wireless networks based on communication standard, such as WiFi, 2G or 3G or their combination. In an example of the present disclosure, the communication component 3016 receives broadcast signals or broadcast-related information from an external broadcast management system via a broadcast channel. In an example of the present disclosure, the communication component 3016 further includes a near field communication (NFC) module to facilitate short-range communication. For example, an NFC module may be implemented based on radio frequency identification (RFID) technology, infrared data association (IRDA) technology, ultra-wideband (UWB) technology, Bluetooth (BT) technology and other technologies.

In exemplary embodiments, the apparatus 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In exemplary embodiments, a non-temporary computer readable storage medium is further provided, for example, the memory 3004 including instructions, in which the instructions may be executed by the processor 3020 of the apparatus 3000 to complete the above methods. For example, the non-temporary computer readable storage medium may be a ROM, a random access memory (RAM), a CD-ROM, a magnetic tape, a floppy disk, an optical data storage device, etc.

After considering the specification and practicing the disclosure herein, those skilled in the art will easily think of other examples of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the examples are to be regarded as exemplary only, and the true scope and spirit of the present application are referred to the appended claims.

It should be understood that the present disclosure is not limited to the precise structure described above and shown in the drawings, and various modifications and changes may be made without departing from its scope. The scope of embodiments of the present disclosure is only limited by the appended claims.

What is claimed is:

1. A method for cell handover, applied to a terminal, comprising:
    when the terminal comprises N subscriber identification modules, measuring a wireless signal quality with one of the N subscriber identification modules, wherein N is an integer greater than or equal to 2, wherein the one of the N subscriber identification modules that measures the wireless signal quality is determined on an occupy proportion of talk time or frequency of use of a data network;
    when a measurement result of the measured wireless signals meets a preset report sending condition, sending a measurement report corresponding to the measurement result to a source base station, wherein the measurement report comprises identification information of subscriber identification modules other than the subscriber identification module measuring the wireless signal quality in the N subscriber identification modules.

2. The method of claim 1, further comprising:
receiving measurement configuration information of one or more subscriber identification modules in the N subscriber identification modules;
wherein measuring the wireless signal quality using one of the N subscriber identification modules comprises:
measuring the wireless signal quality using one of the N subscriber identification modules according to the measurement configuration information.

3. The method of claim 2, wherein receiving measurement configuration information of one or more subscriber identification modules in the N subscriber identification modules comprises:
receiving measurement configuration information of each subscriber identification module in the N subscriber identification modules; and
selecting one from the N subscriber identification modules for measuring the wireless signal quality;
wherein measuring the wireless signal quality using one of the N subscriber identification modules comprises:
measuring the wireless signal quality using one of the N subscriber identification modules according to the measurement configuration information of the selected one subscriber identification module.

4. The method of claim 2, wherein receiving measurement configuration information of one or more subscriber identification modules in the N subscriber identification modules comprises:
receiving measurement configuration information of one subscriber identification module in the N subscriber identification modules;
wherein measuring the wireless signal quality using one of the N subscriber identification modules comprises:
measuring the wireless signal quality using one subscriber identification module corresponding to the received measurement configuration information according to the received measurement configuration information.

5. The method of claim 1, wherein
networks to which the N subscriber identification modules are connected belong to a same operator.

6. A communication device, comprising a processor, a transceiver, a memory and an executable program stored in the memory and capable of running on the processor, wherein the processor is configured to implement the method for cell handover according to claim 1 when running the executable program.

7. A method for cell handover, applied to a base station, comprising:
when a terminal comprises N subscriber identification modules, sending measurement configuration information for one of the N subscriber identification modules to measure a wireless signal quality to the terminal, wherein N is an integer greater than or equal to 2;
wherein the one of the N subscriber identification modules that measures the wireless signal quality is determined on an occupy proportion of talk time or frequency of use of a data network;
receiving a measurement report corresponding to one of the N subscriber identification modules; wherein the measurement report comprises identification information of subscriber identification modules other than the subscriber identification module measuring the wireless signal quality in the N subscriber identification modules; and
sending a cell handover request to a target base station according to the measurement report.

8. The method of claim 7, wherein sending measurement configuration information for one of the N subscriber identification modules to measure the wireless signal quality to the terminal comprises:
sending measurement configuration information for each of the N subscriber identification modules to measure the wireless signal quality to the terminal.

9. The method of claim 7, wherein sending measurement configuration information for one of the N subscriber identification modules to measure the wireless signal quality to the terminal comprises:
sending measurement configuration information for one of the N subscriber identification modules to measure the wireless signal quality to the terminal.

10. The method of claim 7, wherein
networks to which the N subscriber identification modules are connected belong to a same network operator.

11. The method of claim 7, wherein the measurement report comprises: identification information of subscriber identification modules other than the subscriber identification module measuring the wireless signal quality in the N subscriber identification modules.

12. The method of claim 7, wherein the cell handover request comprises identification information of the N subscriber identification modules.

13. A method for cell handover, applied to a base station, comprising:
receiving a cell handover request sent by a source base station on the basis of a measurement report, wherein the cell handover request comprises identification information of N subscriber identification modules comprised in a terminal; wherein the measurement report comprises identification information of subscriber identification modules other than the subscriber identification module measuring wireless signal quality in the N subscriber identification modules, wherein N is an integer greater than or equal to 2; wherein the subscriber identification module measuring the wireless signal quality is determined on an occupy proportion of talk time or frequency of use of a data network; and
attaching the N subscriber identification modules to a target cell corresponding to the target base station according to the identification information of N subscriber identification modules, wherein N is an integer greater than or equal to 2.

\* \* \* \* \*